(12) United States Patent
Parker et al.

(10) Patent No.: US 12,625,663 B1
(45) Date of Patent: May 12, 2026

(54) SYSTEMS AND METHODS FOR PROCESSING IMAGES FORMED USING MULTIPLE DISPLAYS

(71) Applicant: Jackpocket LLC, New York, NY (US)

(72) Inventors: Eric Parker, Brooklyn, NY (US); Redza Shah, Austin, TX (US); Cameron Navarre, Austin, TX (US); Milan Smart, Austin, TX (US); James Mansour, Austin, TX (US)

(73) Assignee: Jackpocket LLC, New York, NY (US)

( * ) Notice: Subject to any disclaimer, the term of this patent is extended or adjusted under 35 U.S.C. 154(b) by 0 days.

(21) Appl. No.: 19/241,813

(22) Filed: Jun. 18, 2025

Related U.S. Application Data

(60) Provisional application No. 63/718,446, filed on Nov. 8, 2024.

(51) Int. Cl.
G06F 3/14 (2006.01)
G06K 7/10 (2006.01)

(52) U.S. Cl.
CPC .......... G06F 3/1415 (2013.01); G06F 3/1446 (2013.01); G06K 7/1095 (2013.01)

(58) Field of Classification Search
CPC .............................. G06F 3/1446; G06K 7/1095
See application file for complete search history.

(56) References Cited

U.S. PATENT DOCUMENTS

| | | | | |
|---|---|---|---|---|
| 2004/0106449 A1* | 6/2004 | Walker | ................ | G07F 17/3227 |
| | | | | 463/25 |
| 2012/0244926 A1* | 9/2012 | Kolios | ................ | G06Q 20/047 |
| | | | | 235/375 |
| 2022/0254470 A1* | 8/2022 | Lafauci | ............. | G06Q 10/0631 |
| 2023/0410070 A1* | 12/2023 | Sriom | ................ | G07F 17/3239 |
| 2025/0118130 A1* | 4/2025 | Gibson | ............. | G07F 17/3206 |

* cited by examiner

*Primary Examiner* — Matthew A Eason
*Assistant Examiner* — Scott D Au
(74) *Attorney, Agent, or Firm* — Bookoff McAndrews, PLLC

(57) ABSTRACT

Systems and methods for generating images of composited displays are described. A system for generating composite displays may include a first display, a camera positioned and oriented such that a view angle of the camera includes both the first display and a terminal display, and at least one memory including instructions. The at least one processor may be operatively connected to the first display, the camera, and the at least one memory, and configured to execute the instructions to perform operations. The operations may include causing the camera to capture an image of the first display and the terminal display to the at least one memory during a time at which the terminal display is outputting information pertaining to a respective entry and the first display is outputting further information pertaining to the respective entry.

18 Claims, 6 Drawing Sheets

300

310

312

13812043110017111563201573

500

1381204311001711115632201573

TICKET NOT A WINNER

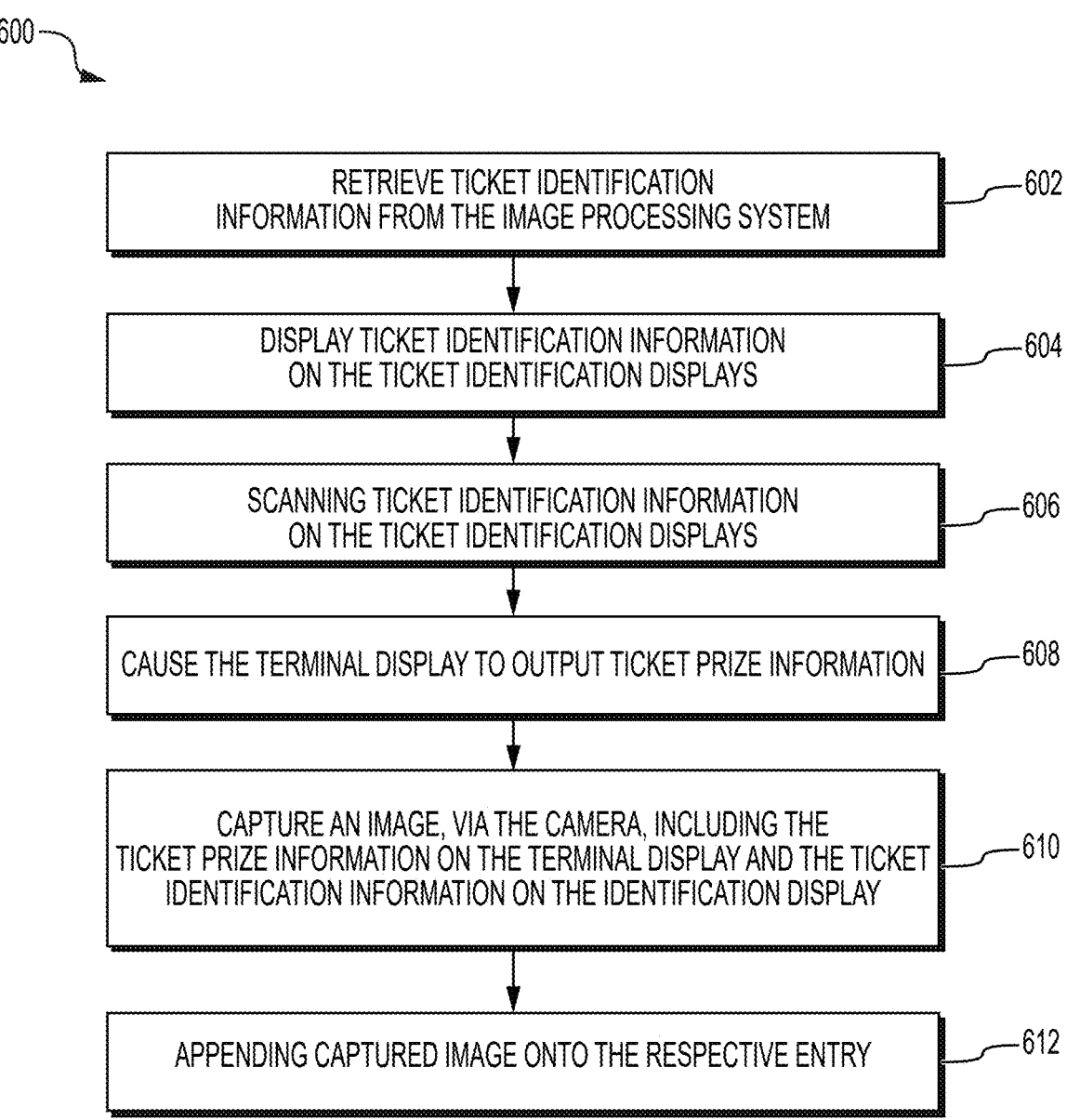

600

RETRIEVE TICKET IDENTIFICATION
INFORMATION FROM THE IMAGE PROCESSING SYSTEM —602

DISPLAY TICKET IDENTIFICATION INFORMATION
ON THE TICKET IDENTIFICATION DISPLAYS —604

SCANNING TICKET IDENTIFICATION INFORMATION
ON THE TICKET IDENTIFICATION DISPLAYS —606

CAUSE THE TERMINAL DISPLAY TO OUTPUT TICKET PRIZE INFORMATION —608

CAPTURE AN IMAGE, VIA THE CAMERA, INCLUDING THE
TICKET PRIZE INFORMATION ON THE TERMINAL DISPLAY AND THE TICKET
IDENTIFICATION INFORMATION ON THE IDENTIFICATION DISPLAY —610

APPENDING CAPTURED IMAGE ONTO THE RESPECTIVE ENTRY —612

FIG. 6

SYSTEMS AND METHODS FOR PROCESSING IMAGES FORMED USING MULTIPLE DISPLAYS

RELATED APPLICATIONS

This application is a non-provisional application of U.S. 63/718,446, filed on Nov. 8, 2024, entitled "A SYSTEMS AND METHODS FOR PROCESSING IMAGES FORMED USING MULTIPLE DISPLAYS," the entirety of which is incorporated herein.

TECHNICAL FIELD

Various embodiments of the present disclosure relate generally to interacting with systems that include multiple displays, and more particularly to supplementing output information in a display by incorporating an additional display, using the multiple displays to generate a composite image, and processing the composite image.

BACKGROUND

A lottery may be generally defined as a game where a player must pay for a chance to win a prize. Games of chance, such as lotteries, are generally subject to a wide variety of laws and regulations across different jurisdictions. For example, regulations generally inhibit a lottery from being played remotely, e.g., via mail or telephone. In the United States, individual states generally enact their own laws and regulation regarding games of chance, such as lotteries, and may perform such actions as licensing retailers to act as game providers, or taking part in one or more of: promoting a game, selling entries (e.g., tickets), redeeming tickets, policing play, etc. For example, many jurisdictions may require that tickets be redeemed at specified terminals. These terminals may or may not produce a record of relevant information about a ticket being redeemed at a terminal, which may inhibit record keeping or reporting activities desirable for remote play. For example, in Texas and Colorado state lotteries, a printout of the information may be generated that includes a ticket serial number, whether the ticket won, how much it won, etc. Such information may be scanned and recorded, e.g., to maintain a record for the ticket and/or facilitate paying out appropriate winnings to the ticket. For instance, ticket information may be uploaded to a cloud-based platform for utilization by an online lottery platform, or the like. In other states, such as Ohio, the lottery terminal may not print receipts for non-winning tickets. Instead, the terminal may show an image on a display that includes the serial number of a ticket, whether the ticket is a winner, and the prize value of the ticket. In some states, such as Arizona, a lottery terminal may display a message indicating whether the ticket is a winner," but may not include a serial number for the ticket in the display. These factors, and others, may have contributed to limiting an extent to which lotteries and other games of chance may innovate and leverage advances in technology, such as the Internet and widespread adoption of communications technologies, such as mobile smart devices.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, the techniques described herein relate to a system for generating images of composited displays may include: a first display; a camera positioned and oriented such that a view angle of the camera includes both the first display and a terminal display; at least one memory including instructions; and at least one processor operatively connected to the first display, the camera, and the at least one memory, and configured to execute the instructions to perform operations, including: during a time at which the terminal display is outputting information pertaining to a respective entry and the first display is outputting further information pertaining to the respective entry, causing the camera to capture an image of the first display and the terminal display to the at least one memory.

In another aspect, the techniques described herein relate to a system for generating images of composited displays may include: a frame that includes a locating member configured to locate the frame relative to a terminal display; a first display mounted on the frame so that the first display is proximate to the terminal display with the frame located with the terminal display via the locating member; and a camera mounted on the frame such that a view angle of the camera includes both the first display and the terminal display.

In some aspects, the techniques described herein relate to a method for generating images of composited displays, including: causing a terminal display to output information associated with a respective entry; displaying, on a first display proximate to the terminal display, further information associated with the respective entry; and capturing an image, via a camera, that includes the information on the terminal display and the further information on the first display.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the present disclosure.

FIG. 6 depicts a flow diagram of an exemplary method for processing images formed using multiple displays.

DETAILED DESCRIPTION

Figure 1:
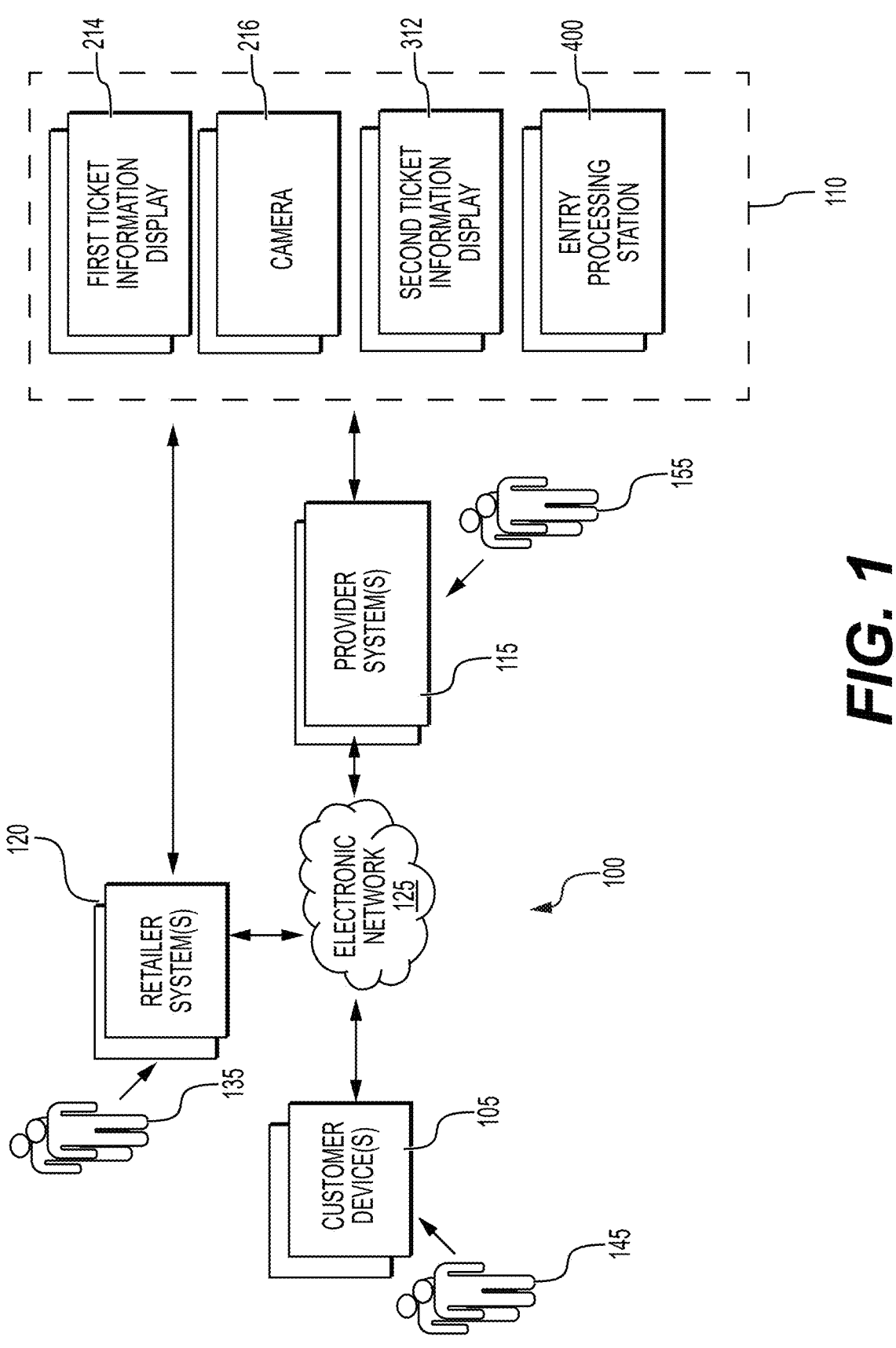
FIG. 1 depicts an exemplary computing environment for processing images formed using multiple displays, according to one or more embodiments

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," and other variations thereof, are intended to cover a non-exclusive inclusion such that a process, method, or product that recites a list of elements does not necessarily include only those elements, but may include other elements not expressly listed or inherent to such a process, method, article, or apparatus. Relative terms, such as "substantially" and "generally," are used to indicate a possible variation of ±10% of a stated or understood value.

Terms like "retailer," "merchant," "vendor," "seller," and the like generally encompass a person and/or entity that may be involved in the providing and/or sale of goods or services, and in particular of entries into an activity such as a game of chance. A "game of chance" generally encompasses an activity where a participant, e.g., a customer, player, or the like, pays for a chance at winning, e.g., a wager, ticket, entry, or the like. The term "provider" generally encompasses a person and/or entity that facilitates, runs, services, supports, licenses, or oversees an activity, e.g., a game of chance. A provider may provide, for example, one or more of a retailer with entries (e.g., lottery tickets), means to provide entries to customers (e.g., a ticket printer, terminal, etc.), funds and/or prizes to distribute to winners, either directly or indirectly, or the like. It should be understood that, in some circumstances, a retailer may be incorporated into or act as an intermediary for a provider.

An activity according to the present disclosure may involve displaying prize information associated with a ticket on a display of a specified redemption terminal. In an illustrative example, games of chance are generally heavily regulated, and thus the act of redeeming a ticket for such a game generally is associated with one or more regulations or requirements that necessitate interactions with a redemption terminal that retrieves prize information associated with a ticket. For instance, a redemption terminal may be configured to retrieve prize information associated with a physical ticket after reading identifying information of the ticket (e.g., ticket information) from the ticket, and display the prize information on a display. Some terminals may display only the prize information associated with the ticket without displaying any ticket information. These types of interactions with redemption terminals generally represent a break in the record keeping or reporting activities that may be beneficial for remote play.

In the following description, exemplary embodiments of the present disclosure will be described with reference to the accompanying drawings. As will be discussed in more detail below, exemplary systems and method for processing images formed using multiple displays are described. Although several examples and embodiments below pertain to providing games of chance, it should be understood that the techniques and technologies disclosed herein may be adapted to any suitable activity associated with multiple displays. For example, the techniques and technologies disclosed herein may be adapted to customer-service activities, manufacturing, communications, or any other suitable activity that incorporates use of multiple displays.

In an exemplary use case, a customer may desire to play a game of chance. The customer may access an electronic application associated with the game of chance, e.g., via an electronic customer device. The customer may submit a request to purchase one or more entries into the game of chance. Upon receiving the request, the provider may store the request to a memory. The provider may then cause a retailer system to generate one or more physical entries (e.g., tickets) corresponding to the one or more purchased entries.

After printing, optical sensors, such as a camera and/or scanner, may capture images of each physical ticket. Software, such as optical character recognition ("OCR") software, may be used to capture and save ticket information from each image that uniquely identifies each ticket. The ticket information may include a barcode and/or serial number printed on the ticket. The images of each ticket and the associated ticket information may be stored to a computer memory and associated with their respective request. Optionally, after capturing images of a ticket and the ticket information, the ticket may be manipulated (e.g., scratched) according to the customer's request, and an image of the manipulated ticket may be captured. The OCR software may again be used to identify the ticket information of the manipulated ticket in the image and associate the image of the manipulated ticket with the previously captured images of the as-printed ticket, the previously captured ticket information, and the respective request.

Once the ticket information has been recorded, the ticket information may be output to one or more ticket identification displays. A first ticket identification display may be located in proximity to a redemption terminal, and a second ticket identification display may be located in proximity to a scanner operatively associated with the redemption terminal.

The redemption terminal may capture the information on one of the ticket identification displays and return prize information associated with the ticket information. For example, the scanner may scan the barcode included in the ticket information from the second ticket identification display. The redemption terminal may retrieve prize information associated with the scanned ticket information and output the prize information to a display of the redemption terminal (e.g., a "terminal display). The prize information may include whether the ticket or entry associated with the ticket information is a winning ticket (e.g., "Ticket Not a Winner", or "Winning Ticket") and/or the amount of any prize associated with the ticket (e.g., "$10.00"). While the terminal display shows the prize information, the first ticket display, which is in proximity to the terminal display, may show the ticket information.

A camera may be used to capture an image of both the prize information shown on the terminal display, and the ticket information shown on the first ticket identification display. The image may be used to create a record of the prize information associated with the ticket as both the prize information and ticket information may be shown in a single image. This image may be accessed by the customer to view and/or verify the results of their entries. By capturing the ticket information shown on the first ticket identification display, the image may provide standard or unified results regardless of the terminal, thereby providing unified images and results regardless of jurisdiction.

FIG. 1 depicts an exemplary computing environment 100 that may be utilized with techniques presented herein. One or more customer device(s) 105, one or more retailer systems 120, and/or one or more provider systems 115, may communicate across an electronic network 125. The provider system(s) 115 may include, or be in communication with, one or more image processing system(s) 110. As will be discussed in further detail below, an image processing system 110 may include one or more first ticket identification display(s) 214, one or more camera(s) 216, one or more second ticket identification display(s) 312, and one or more entry processing station(s) 400 that may communicate with each other and/or one or more of the other components of the computing environment 100 (e.g., the retailer system 120). Each customer device 105 may be associated with a respective customer 145. Each retailer system 120 may be associated with one or more retailers 135, and each provider system 115 may be associated with a respective provider 155.

The customer device 105 may be an electronic device with a computer system, such as, for example, a desktop computer, a smart phone or other mobile device such as a tablet computer, smart watch, etc. In an exemplary embodiment, the customer device 105 is a smart phone, or the like. In some embodiments, the customer device 105 may include one or more electronic application(s), e.g., a program, plugin, etc., installed on a memory of the customer device 105. In some embodiments, the electronic application(s) may be associated with one or more of the other components in the computing environment 100. For example, the electronic application(s) may include customer authentication tools, a digital wallet of the customer, an application that provides access to an online portal, website, or the like for a game of chance hosted by the provider system 115, or the like.

In some embodiments, a retailer 135 may be associated with a plurality of retailer systems 120. In some embodiments, the retailer system 120 may include a game terminal machine, or the like. A game terminal machine generally encompasses a computer system associated with a game of chance and configured to facilitate and/or execute purchases of entries into the game of chance. In some embodiments, the game terminal machine may include a printing mechanism operable to print a physical ticket corresponding to a request for an entry into the game of chance from a customer 145 via a customer device 105. In some embodiments, the game terminal machine may be configured to obtain and/or output, e.g., print, a physical ticket based on request information included on a received request.

In some embodiments, the retailer system 120 may further include a redemption terminal 210 that captures ticket identification information 500 (FIGS. 2-5), and displays prize information 550 (FIGS. 2, 4-5) associated with the ticket identification information 500. The redemption terminal 210 may be in communication with and/or operatively connected to a scanner 310 configured to capture ticket identification information 500. The redemption terminal 210 may further be configured to obtain and/or output, e.g., display, prize information 550 associated with the ticket identification information 500 obtained from the scanner 310 and display the prize information 550.

The provider system 115 may be configured to provide and/or host an activity such as a game of chance, facilitate and/or execute requests and/or purchases for the activity such as entries into the game of chance, facilitate and/or execute transactions associated with the activity such as transferring funds to and from the customer 145 and/or the retailer 135, the provider system 115, etc., or the like. The provider system 115 may include data regarding associations of a request for an entry into a game of chance and information on a physical ticket corresponding to the request for entry into a game of chance. For example, in some embodiments, the provider system 115 includes a mapping of aspects of an entry request to information corresponding to a physical ticket, for example, ticket identification information 500.

The provider system 115 may include an electronic application, a portal, a webpage, or the like that facilitates one or more of purchasing entries for the game of chance, monitoring a position of an entry, validating a position of an entry for a concluded game of chance, recording prize information related to a ticket for a game of chance, transferring funds between one or more of the customer 145, retailer 135, or the like. The provider system 115 may include instructions and/or rules operable to execute the hosting of the game of chance. In some embodiments, as discussed in further detail below, the provider system 115 may be in communication with or otherwise integrated with the image processing system 110 and/or the retailer system 120.

The provider system 115 may include a recording system configured to record information from physical tickets produced by the retailer system 120. In some embodiments, the recording system may include optical sensor, such as cameras, configured to capture images of the physical tickets printed form the retailer system 120. Software, such as OCR software, may be used by the provider system 115 to capture and save ticket identification information 500 from the captured images. In some embodiments, the provider system 115 may associate the ticket identification information 500 from the captured images with respective entry requests and images of printed physical tickets.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to and/or accessing source data or information from a location, local or remote, from other devices or networks coupled to the Internet. "Online" may also encompass to connecting or accessing an electronic network (wired or wireless) via a mobile communications network or device. The Internet is a worldwide system of computer networks—a network of networks in which a party at one computer or other electronic device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, a portion of the provider system 115 may be provided to the customer device 105 as an electronic portal via the electronic application. At least a portion of provider system 115 and/or the image processing system 110 may be integrated into the retailer system 120, or vice versa. Any suitable arrangement of the various systems and devices of the computing environment 100 may be used.

Figure 2:
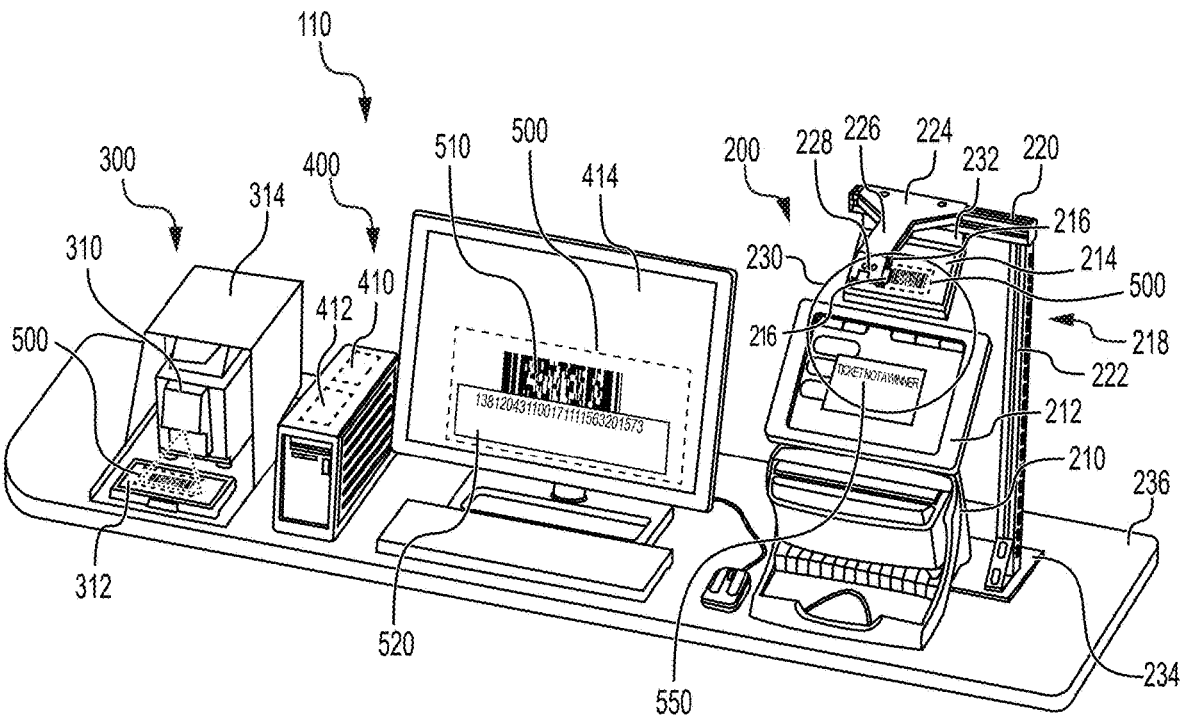
FIG. 2 depicts a perspective view of an exemplary image processing system with a redemption terminal and a scanner.

FIG. 2 depicts a perspective view of an exemplary assembly of an image processing system 110 for generating image of composited displays. The image processing system 110 may include a redemption station 200, a scanning station 300, and the entry processing station 400. The image processing system 110 may be positioned in proximity to a redemption terminal 210 and a scanner 310 operatively connected to the redemption terminal 210.

The redemption station 200 may include the first ticket identification display 214 and the camera 216 mounted to a frame 218. The first ticket identification display 214 and the camera 216 may be mounted to the frame 218 such that a view angle 230 (e.g., field of view) of the camera 216 includes both the first ticket identification display 214 and the terminal display 212 of the redemption terminal 210.

The frame 218 may include a cross member 220 extending laterally from a vertical member 222 attached to a base 234. In some examples, the longitudinal height, lateral position, and/or angular position of the cross member 220 relative to the vertical member 222 may be adjustable. In other examples, the cross member 220 may be fixed in position relative to the vertical member 222, and/or the frame 218 may be unitary. In further embodiments, the frame 218 may be in a different configuration or may include more or less members.

The base 234 may be a locating member, that may be used to locate the frame relative to the terminal display 212. For example, the base 234 may be positionable relative to the redemption terminal 210 by moving (e.g., sliding) the base 234 over a bench 236 on which the redemption terminal 210 sits. In other examples, the locating member may be a structure extending from the frame 218 that aligns and/or touches a portion of the redemption terminal in order to locate the first ticket identification display 214 and the camera 216 in a desired location relative to the redemption terminal 210.

Both the first ticket identification display 214 and the camera 216 may be mounted to the cross member 220 of the frame 218. The camera 216 may be mounted to the frame 218 using a mount 224, which may be axially adjustable along the cross member 220 such that axial position of the camera 216 along the cross member 220 may be adjusted. The mount 224 may include a proximal arm 226 extending perpendicularly away from the cross member 220 and a distal arm 228 at a distal end of the mount 224. The distal arm 228 may be at an angle relative to the proximal arm 226. The camera 216 may be attached to the distal arm 228 such that the lens of the camera 216 points generally towards the redemption terminal 210 and the first ticket identification display 214.

In the example system shown in FIG. 2, the proximal arm 226 and distal arm 228 of the mount 224 may be unitary, such that the angle between the proximal arm 226 and distal arm 228 is fixed. In other examples, the proximal arm 226 and distal arm 228 may be separate and attach to one another using an adjustable attachment means such that the angle(s) between the proximal arm 226 and distal arm 228 may be adjustable. In some examples, the length of the proximal arm 226 and/or the distal arm 228 may be adjustable such that the position of the attached camera 216 away from the frame 218 may be adjusted.

The first ticket identification display 214 may be connected to the frame 218 using a mount 232. In some examples, the mount 232 may be axially adjustable along the cross member 220 such that axial position of the first ticket identification display 214 along the cross member 220 may be adjusted. The mount 232 may hold the first ticket identification display 214 at an angle relative to the vertical direction. In some examples, the mount 232 may be adjust-able such that the angle of the first ticket identification display 214 relative to the frame 218 may be adjustable. In some examples, the mount 232 may include one or more adjustable members that allow for further adjustment of the terminal display 212 relative to the frame 218.

As shown in the example embodiment of FIG. 2, the scanning station 300 may include a second ticket identification display 312 located in proximity to a scanner 310. The second ticket identification display 312 may be positioned so as to be in a view angle of the scanner 310. The scanning station 300 may further include a hood 314 that at least partially surrounds the second ticket identification display 312 so as to reduce a reflectivity of the second ticket identification display 312 as viewed by the scanner 310.

In other examples of the image processing system 110, the scanner 310 may be positioned in proximity to the first ticket identification display 214, such that the first ticket identification display 214 is within the view angle of the scanner 310. For example, the scanner 310 may be mounted to the cross member 220 of the frame 218 next to the camera 216, such that the first ticket identification display 214 is within the view angle of both the camera 216 and the scanner 310. In such examples, the second ticket identification display 312 may be omitted.

As shown in FIG. 2, the entry processing station 400 may include one or more memory unit(s) 410 for storing instructions and a database, one or more processor(s) 412, and/or one or more monitor display(s) 414. The processor 412 may be operatively connected to the memory unit 410, the first ticket identification display 214, the camera 216, the second ticket identification display 312, and/or the monitor display 414.

The entry processing station 400 may be configured to display the ticket identification information 500 for a given entry on the monitor display 414. The ticket identification information 500 may include identification information that uniquely identifies a ticket that has been previously printed by and imaged by, for example, the provider system 115. The ticket identification information 500 may include a bar code 510 and/or a serial number 520 of the physical ticket printed and imaged by the provider system 115. In other examples, the ticket identification information 500 may include additional or alternative identification means that may be captured by an optical sensor, such as the scanner 310.

The entry processing station 400 may be configured to control the first ticket identification display 214, the camera 216, and the second ticket identification display 312. For example, the entry processing station 400 may be configured to cause the first ticket identification display 214 and second ticket identification display 312 to display ticket identification information 500 associated with an entry into a game of chance. In some examples, the entry processing station 400 may also be configured to cause the camera 216 to capture at least one preliminary image in response to detecting a change within the view angle 230 of the camera 216. For example, the entry processing station 400 may cause the camera 216 to capture an image of both the terminal display 212 and first ticket identification display 214 when the image displayed (e.g., prize information 550) on the terminal display 212 changes. For example, the entry processing station 400 may direct the camera 216 to capture an image when text indicating the prize information 550 appears on the terminal display 212. In the example shown in FIG. 5, the text indicating the prize information reads "Ticket Not a Winner", indicating that the entry associated with the ticket identification information 500 is not a winning entry. In some examples, the message may state that "Ticket is a Winner" along with the prize associated with the ticket (e.g. "$10.00") if the ticket is a winner. In other examples, the text or information indicating the prize information associated with an entry may be different. In other examples, the camera 216 may be configured to capture an image whenever it detects a change within the view angle 230 without otherwise receiving an input from another component of the image processing system 110.

The entry processing station 400 may further be configured to match the image captured by the camera 216 to at least one preliminary image of the ticket captured by the provider system 115. The entry processing station 400 may also be configured to alert the provider 155 upon certain occurrences. For example, if the camera 216 captures an image of both the terminal display 212 and the first ticket identification display 214, and the ticket identification information 500 captured in the image does not match ticket identification information 500 stored within the provider system 115, the entry processing station 400 may prune (e.g., delete, erase, or remove) the image and/or flag the image for manual review by a provider 155. Further, if the camera 216 captures partial or duplicative images of ticket identification information 500, the entry processing station 400 may prune the image and/or flag the image for manual review by a provider 155. This may occur, for example, when the camera 216 is configured to capture an image whenever a change is detected in the view angle 230.

Figure 3:
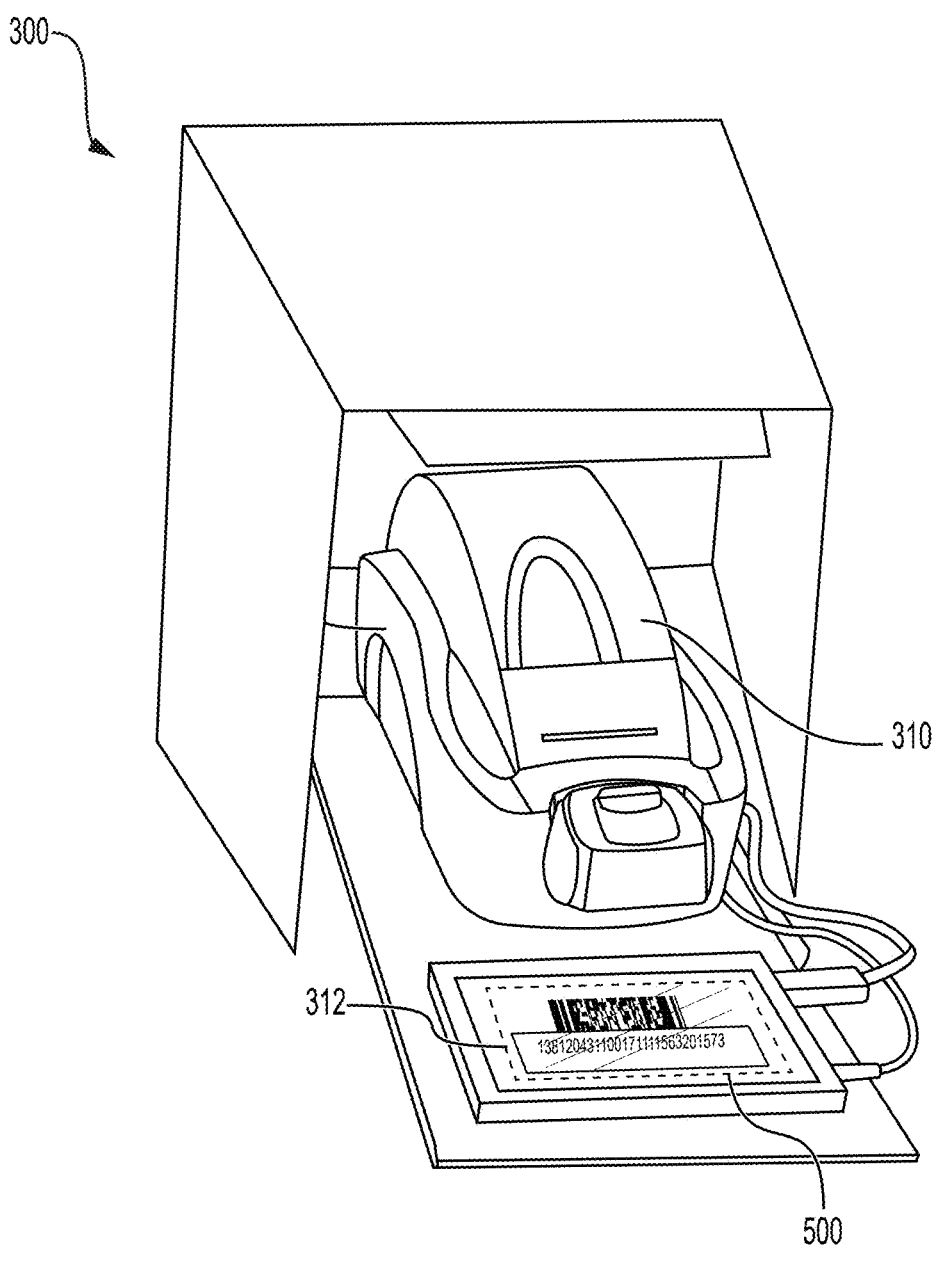
FIG. 3 depicts a close-up perspective view of a scanning station of the image processing system of FIG. 2 with a scanner.

FIG. 3 depicts a close-up perspective view of a scanning station of the image processing system of FIG. 2 with the scanner 310. Scanner 310 may scan the ticket identification information 500 displayed on the second ticket identification display 312. The ticket identification information 500 read by the scanner may be sent to the redemption terminal 210 of the redemption station 200.

The scanner 310 may be a terminal barcode scanner or another type of optical sensor capable of reading text, barcodes, or other visual information from a display. The scanner 310 may be operatively connected to the redemption terminal 210 by a wired or wireless communication means, such as by ethernet, HDMI, Bluetooth, WiFi, or other means for transferring data. In other examples, the scanner 310 may be part of the redemption terminal 210.

In the example embodiment shown in FIGS. 2-3, the scanning station 300 may be part of the image processing system 110 and part of a single provider system 115. In other examples, all or part of the scanning station 300 or its functions may be a part of, or accomplished by, one or more other provider system(s) 115, one or more retailer system(s) 120, or one or more customer device(s) 105. For example, a customer 145 may obtain a physical ticket and use their customer device 105 (such as a smartphone with a camera) to capture the ticket identification information 500 of the physical ticket.

Figure 4:
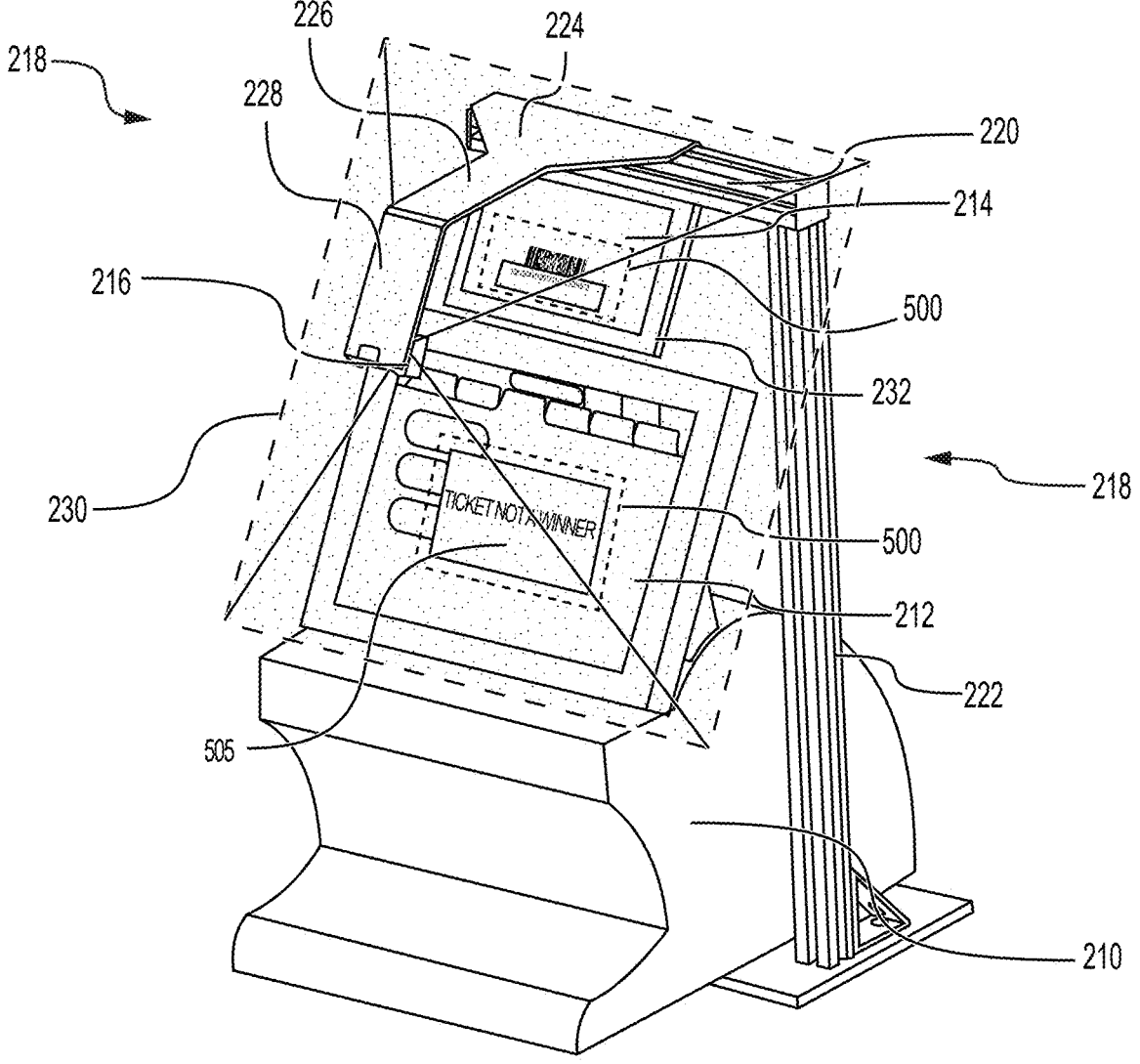
FIG. 4 depicts a close-up perspective view of a redemption station of the image processing system of FIG. 2 with a redemption terminal.

FIG. 4 depicts a close-up perspective view of the redemption station of the system of FIG. 2. The camera 216 may have a view angle 230 (or field of view) that defines the boundaries of the image observed by the camera 216. The camera 216 may be positioned and/or oriented on the mount 224 such that the view angle 230 of the camera 216 includes at least a portion of both the first ticket identification display 214 and the terminal display 212. In some examples, the view angle 230 may be adjustable by changing the zoom and/or focus of the camera 216. In examples where the angle of the distal arm 228 of the mount 224 is adjustable relative to the proximal arm 226, the position of the camera 216 may be adjusted such that the view angle 230 is adjusted.

In the example image processing system 110 shown in FIGS. 2 and 4, the first ticket identification display 214 is shown as proximate to the terminal display 212 relative to the camera. In other embodiments, the first ticket identification display 214 may be distal to the terminal display 212 relative to the camera 216. In yet further embodiments, the first ticket identification display 214 may be the same distance away from the camera 216 as the terminal display 212.

In the example image processing system 110 shown in FIGS. 2 and 4, the first ticket identification display 214 and/or the camera 216 are supported by the cross member 220 of the frame 218. In other examples, the first ticket identification display 214 and/or the camera 216 may be supported by another member of the frame 218, such as the vertical member 222. In further examples, the first ticket identification display 214 and/or the camera 216 may be supported by a different means. For example, the first ticket identification display 214 and/or the camera 216 may be mounted to the redemption terminal 210, the bench 236, a server rack, or another suitable support means.

Figure 5:
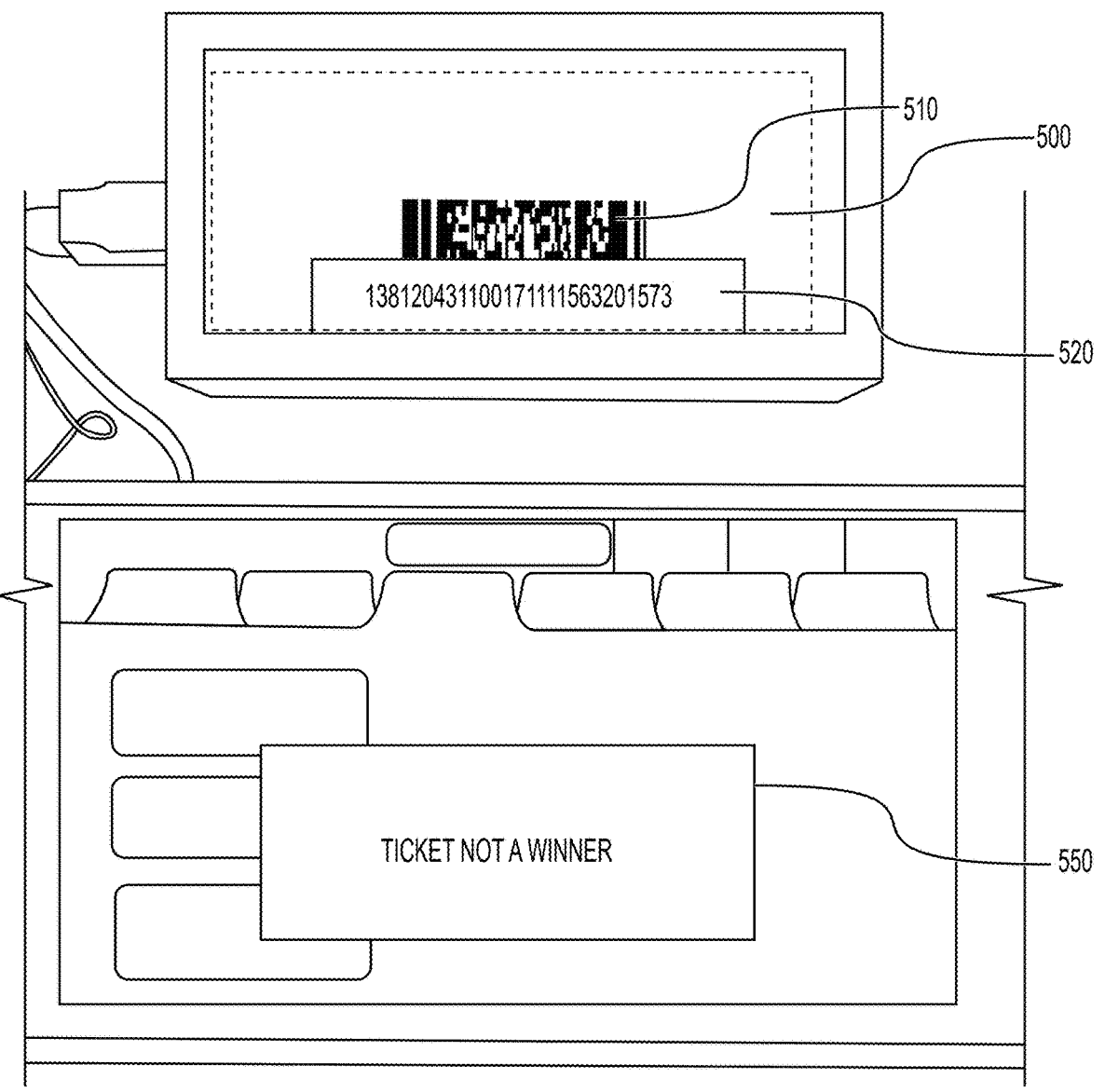
FIG. 5 depicts an exemplary image taken by the image processing system of FIG. 2.

FIG. 5 depicts an exemplary image 700 captured by the camera 216 of the image processing system 110 of FIG. 2. The image 700 may be a composite of both the prize information 550 displayed on the terminal display 212 and the ticket identification information 500 displayed on the first ticket identification display 214. Thus, the image captured has both the ticket identification information 500 and prize information 550 associated with a given entry in a single picture or image.

The image processing system 110 described above may be used to capture ticket identification information 500 for multiple types of games or tickets. For example, the image processing system 110 may be used to capture ticket identification information 500 for lottery tickets where relevant information is printed on the face of a ticket, and no manipulation of the ticket is required. In other examples, the image processing system 110 may be used to capture ticket identification information 500 scratch off tickets that require manipulation of the ticket in order to reveal all or part of the relevant ticket identification information 500. In such examples, the image processing system 110 may be used in conjunction with or as a part of a ticket manipulation system that can manipulate the ticket according to inputs from the customer 145. In such examples, the image processing system 110 may capture and/or display relevant information pertaining to user selections for manipulating the ticket as part of the ticket identification information 500.

FIG. 6 illustrates a flow diagram of an exemplary method 600 of generating images of composited displays according to the present disclosure. At a step 602, an image processing system 110 may retrieve ticket identification information 500 previously captured by a provider system 115 and associated with an entry for a game of chance. The ticket identification information 500 may include a bar code 510 and a serial number 520 the uniquely identifies a physical ticket associated with an entry into a game of chance.

The retrieval of the ticket identification information 500 may be performed by an entry processing station 400, which may include a memory unit 410, a processor 412, and/or a monitor display 414. The processor 412 may be operatively linked to the memory unit 410 and the monitor display 414, as well as a first ticket identification display 214, a camera 216, and a second ticket identification display 312 of the image processing system 110. The processor 412 may execute instructions to output ticket identification information 500 from a database held, for example, within the memory unit 410 that associates ticket identification information 500 with an entry. The processor 412 may serially output ticket identification information 500 to the monitor display 414, the second ticket identification display 312, and/or the first ticket identification display 214.

At a step 604, the ticket identification information 500 may be displayed on the monitor display 414, the second ticket identification display 312, and/or the first ticket identification display 214. In some examples, the ticket identification information 500 output by the entry processing station 400 to the monitor display 414 may be mirrored on the first ticket identification display 214 and the second ticket identification display 312. In other examples, the first ticket identification display 214 and second ticket identification display 312 may display only part of the ticket identification information 500 output by the 400. The portion of the ticket identification information 500 displayed by the first ticket identification display 214 may be different from the portion of the ticket identification information 500 displayed by the second ticket identification display 312. For example, the first ticket identification display 214 may display the serial number 520 and the second ticket identification display 312 may display the bar code 510.

At a step 606, a scanner 310 operatively connected to a redemption terminal 210 may scan the ticket identification information 500 displayed on the second ticket identification display 312. The scanner 310 may transmit the scanned ticket identification information 500 to the redemption terminal 210, and the redemption terminal 210 may retrieve prize information 550 associated with a ticket or entry having ticket identification information 500. At a step 608, a terminal display 212 of the redemption terminal 210 may display the prize information 550 retrieved by the redemption terminal 210.

At a step 610, the camera 216 may capture an image that includes the prize information 550 displayed on the terminal display 212 and the ticket identification information 500 displayed on the first ticket identification display 214. The camera 216 may be instructed by the entry processing station 400 to capture an image in response to detecting a change within the view angle of the camera 216. For example, the entry processing station 400 may instruct the camera 216 to capture an image in response to the terminal display 212 producing a new message with prize information 550. The camera 216 may also be instructed to capture an image based on a time delay from when the processing station 400 sends the ticket identification information 500 to the first ticket identification display 214. In other examples, the camera 216 may be instructed to capture an image based on one or more instructions received from one or more of the entry processing station 400, the scanner 310, the redemption terminal 210, the first ticket identification display 214, or the second ticket identification display 312.

The entry processing station 400 may use OCR to attempt to match the ticket identification information 500 within the image captured in step 610 to a respective entry. If the entry processing station 400 is able to find a match, then at a step 612, the image captured by the camera 216 may be appended to the respective entry information stored within the entry processing station 400. Once stored, the image captured by the camera 216 may be sent or otherwise be made viewable to by a customer device 105 associated with a respective customer 145.

If the entry processing station 400 is unable to match the ticket identification information 500 within the image captured in step 610 to a respective entry, then the 400 may prune the respective entry for the memory unit 410, or flag the image for manual review by the provider 155.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those skilled in the art.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

We claim:

1. A system for generating images of composited displays, comprising:

a first display;

a camera positioned and oriented such that a view angle of the camera includes both the first display and a terminal display, the terminal display being configured to display information pertaining to respective entries associated with one or more transactions, and the first display being configured to display further information pertaining to the respective entries;

at least one memory including instructions; and at least one processor operatively connected to the first display, the camera, and the at least one memory, and configured to execute the instructions to perform operations, including:

during a time at which the terminal display is outputting information pertaining to a respective entry and the first display is outputting further information pertaining to the respective entry, causing the camera to capture an image of the first display and the terminal display, wherein causing the camera to capture an image of the first display and the terminal display includes:

causing the camera to capture at least one preliminary image in response to detecting, via the camera, a change within the view angle; and matching one of the at least one preliminary images to the respective entry.

2. The system of claim 1, further comprising:

a second display configured to output information pertaining to a respective entry that mirrors information output by the first display.

3. The system of claim 2, further comprising:

a scanner operatively connected to the at least one processor and to the terminal display, wherein the second display is positioned so as to be in a view angle of the scanner.

4. The system of claim 3, wherein:

the information pertaining to the respective entry includes an identifier of the respective entry; and the operations further include causing the scanner to capture the identifier output by the second display and transmit the identifier to the terminal display, wherein transmitting the identifier to the terminal display causes the terminal display to output the information pertaining to the respective entry.

5. The system of claim 4, further comprising:

a third display, wherein the first and second displays are configured to output information that mirrors information output by the third display.

6. The system of claim 3, further comprising:

a hood at least partially surrounding the second display and configured to reduce a reflectivity of the second display as viewed by the scanner.

7. The system of claim 1, wherein capturing the image to the at least one memory further includes:

pruning at least one preliminary image not matched to the respective entry.

8. The system of claim 1, wherein capturing the image to the at least one memory further includes:

flagging at least one preliminary image not matched to the respective entry for manual review.

9. A system for generating images of composited displays, comprising:

a frame that includes a locating member configured to locate the frame relative to a terminal display configured to display information pertaining to respective entries associated with one or more transactions:

a first display mounted on the frame so that the first display is proximate to the terminal display;

a camera mounted on the frame such that a view angle of the camera includes both the first display and the terminal display; and a computer that includes:

at least one memory storing instructions and a database of entries:

a second display; and at least one processor that is operatively connected to the at least one memory, the second display, the first display, and the camera, and that is configured to execute the instructions to perform operations that include:

serially outputting identifiers from entries in the database on the second display, wherein the first display is configured to mirror the output of the second display; and causing the camera to capture to the at least one memory a respective image that includes both the first display outputting a respective identifier and the terminal display outputting information associated with an entry corresponding to the respective identifier.

10. The system of claim 9, further comprising:

a third display, wherein the output of the third display is configured mirror the output of the second display.

11. The system of claim 10, further comprising:

a scanner operatively connected to the at least one processor and to the terminal display, wherein the third display is positioned so as to be in a view angle of the scanner.

12. The system of claim 11, further comprising:

a hood at least partially surrounding the third display and configured to reduce a reflectivity of the second display as viewed by the scanner.

13. A method for generating images of composited displays, comprising:

causing a terminal display to output information associated with a respective entry;

displaying, on a first display proximate to the terminal display, further information associated with the respective entry; and capturing an image, via a camera, that includes the information on the terminal display and the further information on the first display, wherein causing the terminal display to output the information includes;

outputting, on a second display, further information associated with the respective entry, and scanning the further information on the second display using a scanner operatively connected to the terminal display.

14. The method of claim 13, further comprising:

mirroring an output of a third display on the first display and the second display.

15. The method of claim 14, wherein the further information includes one or more of a barcode or a serial number.

16. The method of claim 13, further comprising:

appending the captured image to the respective entry.

17. The method of claim 13 wherein the camera and the first display are mounted to a frame.

18. A system for generating images of composited displays, comprising:

a first display;

a second display that mirrors information output by the first display;

a camera positioned and oriented such that a view angle of the camera includes both the first display and a terminal display, the terminal displaying being configured to display information pertaining to respective entries associated with one or more transactions, and the first display being configured to display further information pertaining to the respective entries;

at least one memory including instructions;

at least one processor operatively connected to the first display, the camera, and the at least one memory, and configured to execute the instructions to perform operations, including:

during a time at which the terminal display is outputting information pertaining to a respective entry and the first display is outputting further information pertaining to the respective entry, causing the camera to capture an image of the first display and the terminal display, wherein the information pertaining to the respective entry includes an identifier of the respective entry and a scanner operatively connected to the at least one processor and to the terminal display, wherein the second display is positioned so as to be in a view angle of the scanner, wherein the operations further include:

causing the scanner to capture the identifier output by the second display and transmit the identifier to the terminal display, wherein transmitting the identifier to the terminal display causes the terminal display to output the information pertaining to the respective entry.

* * * * *